Patented Mar. 19, 1935

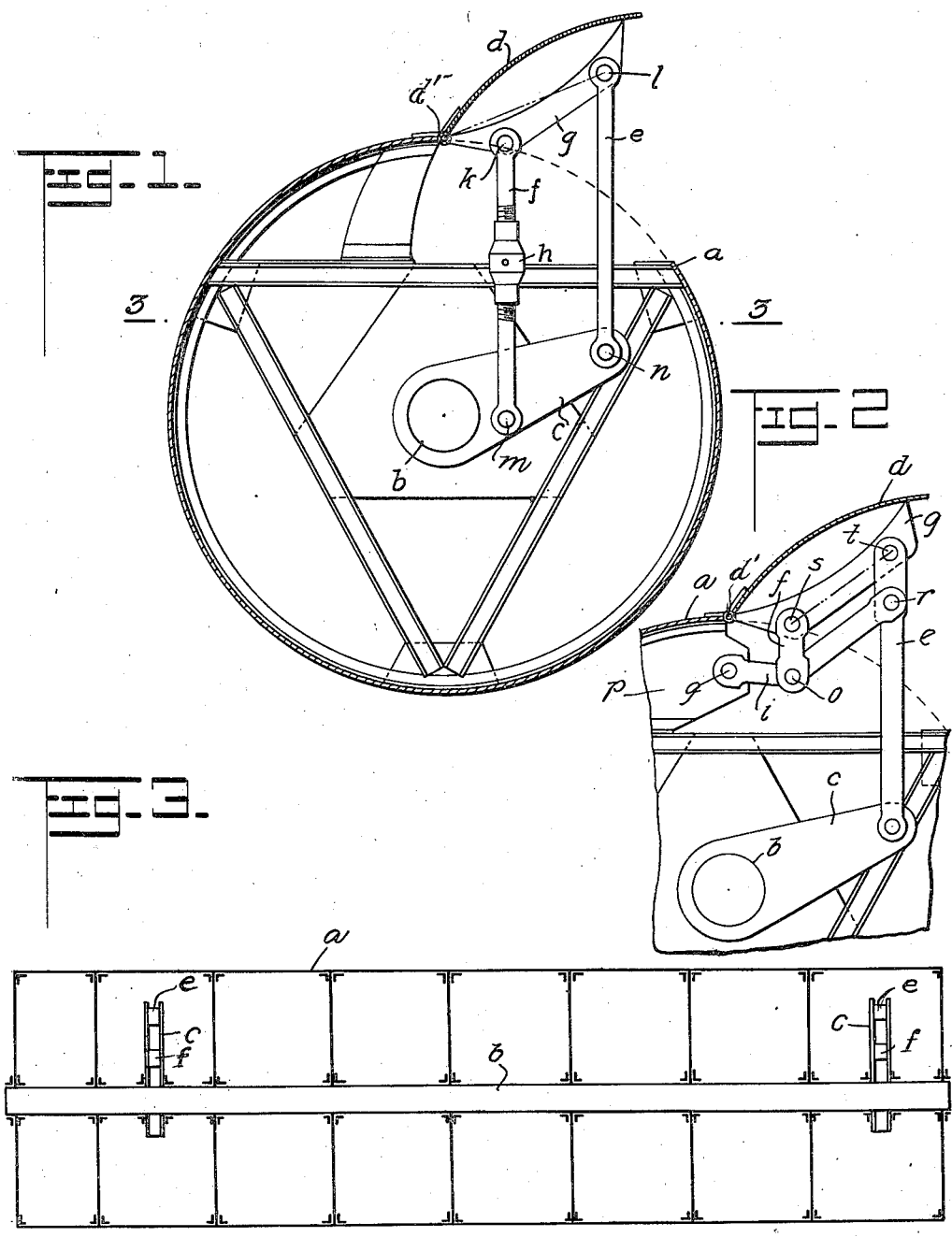

1,994,687

UNITED STATES PATENT OFFICE 1,994,687

WEIR

Paul Cicin, Mainz, Germany, assignor to Maschinenfabrik Augsburg-Nürnberg A. G., Nuremberg, Germany, a corporation of Germany Application August 12, 1932, Serial No. 628,587
In Germany August 19, 1931

3 Claims. (Cl. 61—22)

My invention relates to operating devices for damming flaps of weir closures, for instance such as roller weirs, lifting sluices and the like in which the driving power is transmitted by means of a crank shaft extending through the closing body of the weir and being driven by any desired means, for instance hydraulically with the aid of cog-wheel gearings, or by means of an electromotor or in any other manner, said crank shaft being connected with the flap by a link, or a plurality of links, engaging the flap on the tail water side.

With operating devices as hitherto designed the flap hinge was subjected to the counter-force produced by the lifting power, and in the case of one-sided drive, that is to say, a drive taking place at only one end of the torsion-proof flap, the torsion moment transmitted by the flap must be taken up by this latter at the driven end, in view of which the flap hinge must be designed correspondingly strong.

The present invention relates to an operating device in which a stationary flap shaft is dispensed with, and the invention more particularly consists in the combination with a crank arm, or a plurality of crank arms, secured to the driving shaft which extends through the weir body of, pairs of links engaging the bending-proof and torsion-proof flap and extending parallel to the connecting plane passing through the axis of the driving shaft and through the flap hinges, said links engaging the flap at points which are so located with respect to the points of engagement of the links at the crank arm that the connecting line passing through the hinge axis point and the points of engagement of the links at the flap extends parallel to the connecting line which passes through the axis point of the driving shaft and the points of engagement of the links with the crank arm.

Because of this peculiar arrangement and combination of the parts the flap is freely carried by the links and turns freely on the theoretical axis of its hinges. In the case of one-sided operation the moment counteracting the torsion moment is produced in that the inner link, viz. the one located nearest to the theoretical axis of the hinges, takes up a tensile stress which is opposite to, and as great as, the compressive stress taken up by the outer or other link.

Instead of letting both members of the pairs of links engage directly the crank arm or crank arms of the driving shaft, the inner link of each pair may be shorter and its lower end may be joined to an intermediate lever supported by the weir closing body in the plane passing through the hinge axis of the flap and being connected with the outer link at a hinge point which is as far remote from the point of engagement of this link on the crank arm as the pivotal axis of said intermediate lever from the pivotal axis of the driving shaft. The hinge points on the intermediate lever must be so placed that the line connecting them extends parallel to the connecting line passing through the hinge axis and the points of engagement with the flap.

The invention is illustrated diagrammatically and by way of example, on the accompanying drawing on which Figure 1 is a side-view of an operating device designed according to this invention, and Figure 2 a similar view showing a modification, while Fig. 3 is a horizontal longitudinal section along line III—III in Fig. I, drawn to a smaller scale.

In Fig. 1, $a$ denotes the weir closing body (indicated by a circular line) and $b$ the driving shaft which extends through the body $a$ in the axis of the same. The shaft $b$ is designed in this instance as a torsion-proof hollow cylinder, and near its ends is provided with a crank-arm $c$. $d$ denotes the damming flap which is both bending-proof and torsion-proof and is hingedly supported at $d'$ in the vertical plane passing through the axis of the body $a$. With the flap $d$ the crank-arms $c$ are pivotally connected each by two links $e$ and $f$ which extend parallel to said plane. The links engage the flap, however, not directly, but the flap is provided with a web (or webs) $g$ forming a part (or parts) thereof and being located on the tail side of the same, and establishing the connections of the flap with the pair or pairs of links. The links engage the web $g$ at the points $k$ and $l$ which are equally remote from the points of engagement $m$ and $n$ of the links with the crank arm $c$. The connecting line passing through the hinge point of the flap and the points of engagement $k$ and $l$ of the links with the web $g$, extends, thus, parallel to the connecting line which passes through the axis of the shaft $b$ and the points of engagement $m$ and $n$ of the links with the crank-arm $c$.

In order to provide for the equalization of possible inaccuracies the link which is located nearest the hinge end of the flap is provided with a coupling member $h$ which permits the length of that link to be so accurately adjusted with respect to the length of the other link that when the shaft $b$ is turned, the flap $d$ turns freely on its hinge in such a manner that the hinge is not in the least subjected to strains or stresses.

In the modification shown in Fig. 2 the arrangement of the shaft $b$, the crank arm $c$, the flap $d$, the link $e$, and the web $g$, is the same as in Fig. 1, but the inner link ($f'$) is considerably shorter than in Fig. 1, and is with its lower end pivotally connected at $o$ with a crooked intermediate lever $i$ supported on a brace $p$ of the weir closing body $a$ at a point $q$ situated vertically above the axis of the shaft $b$. The other end of said intermediate lever $i$ is joined to the link $e$ at $r$. The hinge point $o$ where the lever $f'$ is connected with the lever $i$ and the hinge point $r$, where the lever $i$ is connected with the link $e$ are as far remote from the hinge points $s$ and $t$ where the links $e$ and $f'$ engage the web $g$ of the flap $d$ as are the hinge points of the flap $d$ and the intermediate lever remote from one another.

The manner of operation of this modification is the same as that of the construction shown in Fig. 1.

I claim:

1. In a weir structure, a closure body, a damming flap hinged thereto, an operating shaft extending through the closure body, and a plurality of link and lever parallelogram units connecting the flap with said shaft at points spaced longitudinally along the shaft and flap, whereby rotation of the shaft effects swinging movement of the flap.

2. In a weir closure, the combination with the closure body, a damming flap hinged thereto and an operating shaft extending through said closure body, of an operating mechanism for said flap, comprising crank arms mounted on said shaft and links pivotally connected with said flap, a pair of said links being pivotally connected with each crank arm and being disposed parallel to a plane passing through the axis of said shaft and the hinge of said flap.

3. In a weir closure, the combination with the closure body, a damming flap hinged thereto and an operating shaft extending through said closure body, of an operating mechanism for said flap, comprising crank arms mounted on said shaft and links pivotally connected with said flap, a pair of said links being operatively associated with each crank arm and being disposed parallel to a plane passing through the axis of said shaft and the hinge of said flap, the outer links of each pair of links directly pivotally engaging the corresponding crank arm, the inner shorter link being operatively connected with the corresponding crank arm by means of the said outer link and an intermediate lever pivotally connected with said outer link and pivotally supported in said closure body in a plane passing through the axis of said operating shaft and the hinge of said flap, the said shorter link pivotally engaging said intermediate lever between its pivotal support and its pivotal engagement with the said longer link.

PAUL CICIN.